United States Patent [19]
Gudat et al.

[11] Patent Number: 6,140,959
[45] Date of Patent: Oct. 31, 2000

[54] SELF-CALIBRATING GPS REFERENCE STATION AND METHOD

[75] Inventors: Adam J. Gudat, Edelstein; Gregory R. Harrod, Peoria; Daniel E. Henderson, Washington, all of Ill.

[73] Assignee: Caterpillar Inc., Peoria, Ill.

[21] Appl. No.: 08/615,349

[22] Filed: Mar. 13, 1996

[51] Int. Cl.[7] .............................. G01S 5/02; H04B 7/185
[52] U.S. Cl. ............................ 342/357.12; 342/357.06; 701/213
[58] Field of Search ..................... 342/357, 457, 342/174, 357.12, 357.06; 701/213; 455/12.1

[56] References Cited

U.S. PATENT DOCUMENTS

| | | | |
|---|---|---|---|
| 5,210,540 | 5/1993 | Masumoto | 342/357 |
| 5,361,212 | 11/1994 | Class et al. | 364/428 |
| 5,488,559 | 1/1996 | Seymour | 364/449 |
| 5,564,079 | 10/1996 | Olsson | 455/54.1 |
| 5,610,614 | 3/1997 | Talbot et al. | 342/352 |
| 5,764,511 | 6/1998 | Henderson | 364/167.01 |

*Primary Examiner*—Thomas H. Tarcza
*Assistant Examiner*—Dao L. Phan
*Attorney, Agent, or Firm*—James R. Yee

[57] ABSTRACT

A self-calibrating Global Positioning System (GPS) reference station and method for operating the reference station. The reference station includes a station frame, a GPS receiver and a controller mounted on the station frame. The controller upon power up, determines if the reference station has been moved and determines a new reference position of the reference station if the reference station has been moved. The GPS receiver is then placed into a reference station mode.

5 Claims, 2 Drawing Sheets

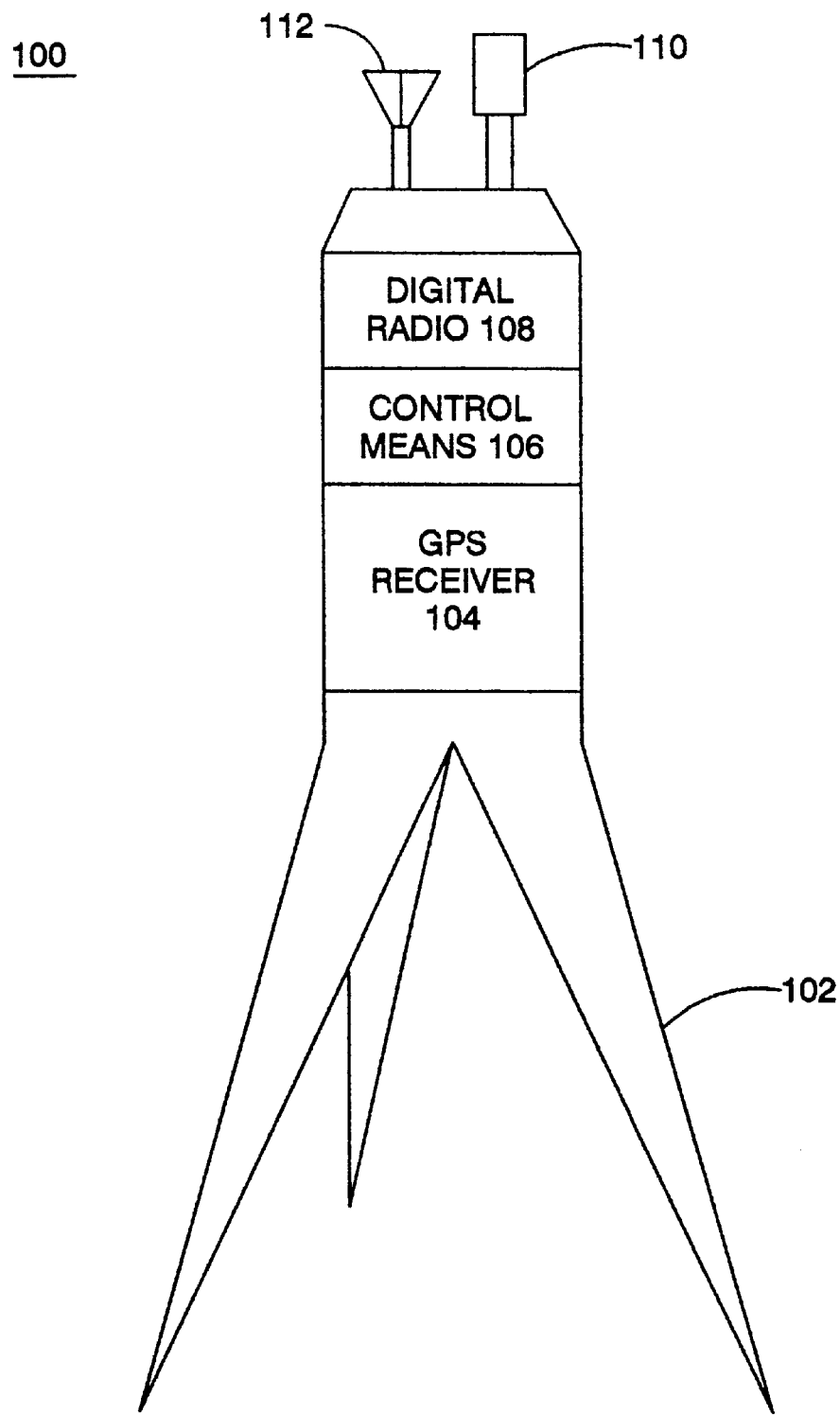
Fig_1_

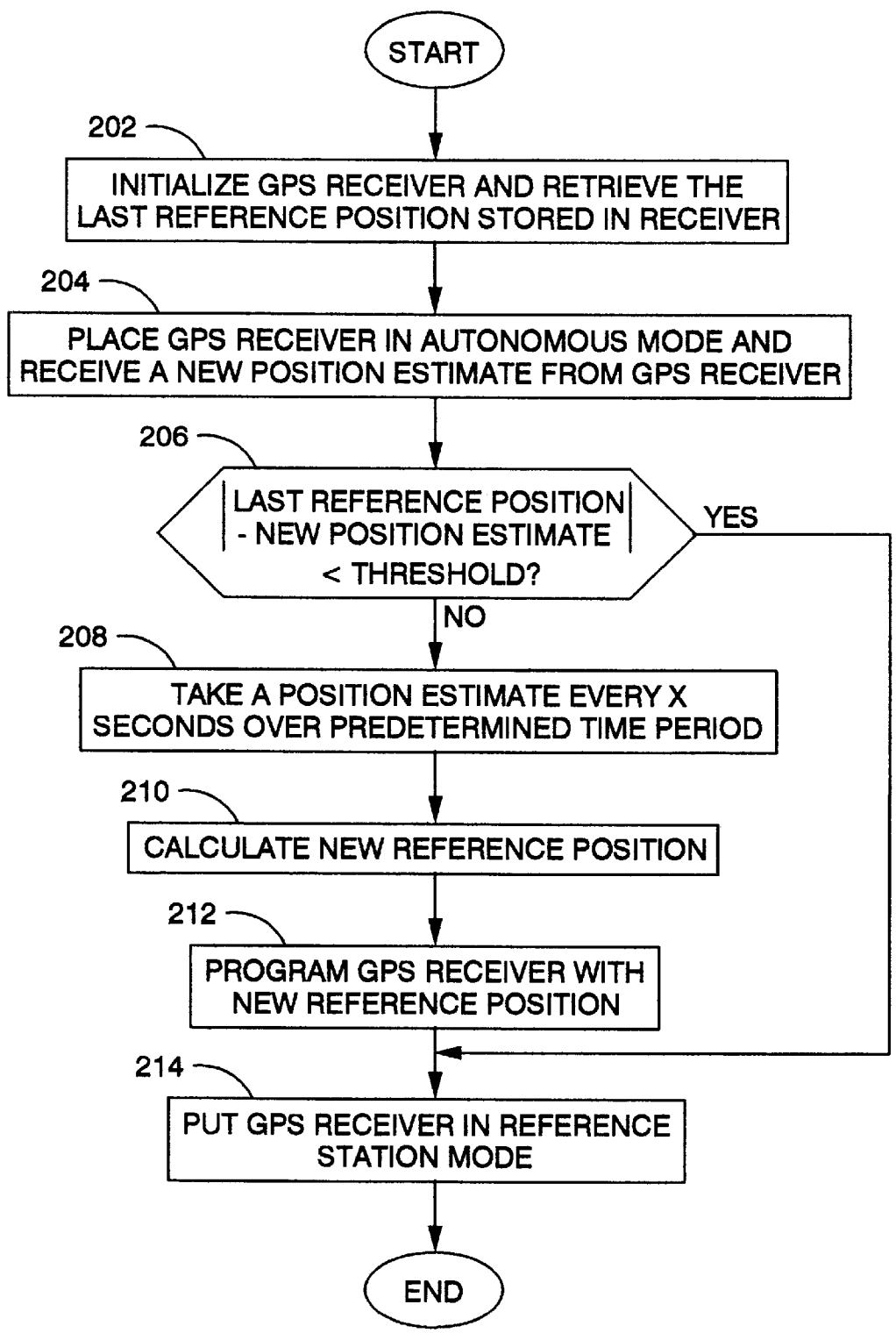
Fig_2

SELF-CALIBRATING GPS REFERENCE STATION AND METHOD

TECHNICAL FIELD

The present invention relates generally to a reference station for use with the Global Positioning System (GPS) satellites, and more particularly, to a self-calibrating GPS reference station and method for operating the station.

BACKGROUND ART

The U.S. Government has developed a Global Positioning System (GPS). The GPS consists of a number of GPS satellites. A GPS receiver receives signals from the receivers and determines the terrestrial position of the GPS receiver.

The GPS satellite signals are processed by the GPS receiver using triangulation techniques in order to estimate the position of the receiver. Commercial GPS receivers have position estimate accuracies of ±100 meters.

One solution to obtaining more accurate position estimates is Differential GPS. Differential GPS utilizes a reference station in order to improve accuracy. The reference station is equipped with a GPS receiver known as a Differential GPS receiver. The Differential GPS receiver produces correction signals in response to the signals received from the GPS satellites. The correction signals and/or other reference station information are transmitted to the GPS receiver at the user location and are used to improve the accuracy of the user position estimates.

Typically, the reference station is located at a central, fixed location. However, a particular work site may contain locations where a fixed, permanent reference station is not practical or where communication signals from the reference station cannot be received.

The present invention is aimed at one or more of the problems identified above.

DISCLOSURE OF THE INVENTION

In one aspect of the present invention, a method for automatically calibrating a Global Positioning System (GPS) satellite reference station is provided. The reference station includes a station frame, a GPS receiver and a controller mounted on the station frame. The controller is adapted to calibrate the GPS receiver. The method includes the steps of retrieving from the GPS receiver a last reference position and receiving from the GPS receiver a new position estimate. The new position estimate and the last reference position are compared. If the new position estimate is not within a preset range of the last reference position, then a new reference position is determined.

In another aspect of the present invention, a self-calibrating Global Positioning System (GPS) reference station is provided. The reference station includes a station frame, a GPS receiver mounted on the station frame, and a controller for calibrating the reference station.

BRIEF DESCRIPTION OF THE DRAWINGS

FIG. 1 is a diagrammatic illustration of a self-calibrating Global Positioning System (GPS) reference station, according to an embodiment of the present invention; and FIG. 2 is a flow diagram illustrating operation of the self-calibrating GPS reference station of FIG. 1.

BEST MODE FOR CARRYING OUT THE INVENTION

With reference to FIGS. 1 and 2, the present invention provides a self-calibrating Global Positioning System (GPS) reference station 100 and a method for operating the reference station 100.

With specific reference to FIG. 1, the reference station includes a station frame 102, a GPS receiver 104 mounted to the station frame 102, and a controlling means 106. In the preferred embodiment the controlling means 106 is a microprocessor-based controller.

In the preferred embodiment, the GPS receiver 104 is a Differential GPS receiver which is adapted to determine correction signals based on the signals received from the satellites and the reference station's known position. A GPS receiver, located at the user site, receives the correction signals and signals from the GPS satellites and determines the user position as a function of the signals. Use of Differential GPS receivers is well-known in the art, and is therefore not discussed further.

One suitable Differential GPS receiver is available from Magnavox Advanced Products and Systems Company of Torrance, Calif.

The reference station 100 also includes a digital radio 108, a radio antenna 112 coupled to the digital radio 108, and a GPS antenna 110 coupled to the GPS receiver 104.

Differential GPS receivers calculate correction signals based on the signals received from the GPS satellites and the known position of the GPS receiver. The present invention provides an apparatus and method which allows the reference station to be moved to a different location without the need of manually surveying the new location.

The controlling means 106 controls the GPS receiver 104 and calibrates the receiver. As discussed with reference to FIG. 2, the controlling means 106 first determines if the reference station 100 has been moved to a new location, and if the reference station 100 has been moved, determines a new position of the reference station.

With particular reference to FIG. 2, the controlling means 106 in a first control block 202 initializes the GPS receiver 104 and retrieves the last reference position stored in the GPS receiver 104. In a second control block 204, the GPS receiver is placed in an autonomous mode and a new position estimate of the reference station's position is received from the GPS receiver 104. In the autonomous mode, the GPS receiver 104 determines an estimate of its position.

In a first decision block 206, the last position estimate and the new position estimate are compared. If the new position estimate is within a preset range of the last reference position, then control proceeds to a sixth control block 214.

If in the first decision block 206, the last position estimate is not within the preset distance from the last stored position estimate, then control proceeds to a third control block 208.

In the third control block 208, the controlling means 106 receives position estimates from the GPS receiver 104 every X seconds over a preset time period. In the preferred embodiment the controlling means 106 receives a position estimate every 20 seconds over a 24 hour time period.

In a fourth control block 210, the controlling means 106 calculates a new reference position as a function of the position estimates received from the GPS receiver 104 over the preset time period. In the preferred embodiment the current position estimate is the average of the series of estimates received over the time period.

In a fifth control block 212, the GPS receiver 104 is programmed with the new reference station position.

In the sixth control block 214, the GPS receiver is placed in a reference station mode. In the reference station mode, the Differential GPS receiver 104 receives the signals from the GPS satellites and calculates the correction signals. The correction signals are broadcast to the user by the digital radio means 108.

Industrial Applicability

With reference to the figures and in operation, the present invention provides a selfcalibrating Global Positioning System (GPS) reference station 100 and a method for operating the reference station 100.

The reference station 100 is adapted for use with mobile machines (not shown) equipped with GPS receivers for determining their own position. In the preferred embodiment the GPS receiver 104 mounted on the reference station 100 is a Differential GPS receiver adapted for determining and transmitting correction signals.

The reference station 100 is adapted to be mobile, i.e., the reference station 100 may be moved from one location to another without requiring a manual survey of the location.

Upon power up, the controlling means 106 initializes the GPS receiver 104 and determines if the reference station 100 has been moved. This is accomplished by comparing the last stored position in the GPS receiver 104 with a new position estimate from the GPS receiver.

As discussed above, if the difference between the last stored position estimate and the new position estimate is greater than a predetermined threshold, then the reference station 100 has been moved and a new position estimate must be determined.

The predetermined threshold is a function of the accuracy of the GPS receiver 104. For example, without using Differential GPS, the accuracy of the GPS receiver is plus or minus 100 meters. Thus, if the last stored position and the new position estimate are within 100 meters of each other, then the reference station is assumed not to have been moved.

However, if the last stored position estimate and the new position estimate are not within 100 meters of each other then the reference station 100 is assumed to have been moved. If the reference station 100 has been moved then a new current position of the reference station 100 must be determined.

To determine a new current position of the reference station 100, the GPS receiver 104 is put into an autonomous mode wherein position estimates are continuously computed.

A series of position estimates are computed over a predetermined time period. In the preferred embodiment, position estimates are received every 20 seconds over a 24 hour time period. The series of position estimates are averaged over the 24 hour period to calculate the new reference position.

After the new current position is determined, the GPS receiver 104 is programmed with the new reference position and the receiver 104 is placed in the reference station mode. In the reference station mode, the GPS receiver 104 calculates correction signals and relays the correction signals to the controlling means 104. The correction signals are then transmitted via the radio 108 to the mobile machines for use in determining their own position.

Other aspects, objects and features of the present invention can be obtained from a study of the drawings, the disclosure, and the appended claims.

What is claimed is:

1. A method for automatically calibrating a Global Positioning System (GPS) satellite reference station, the reference station includes a station frame, a GPS receiver and a controller being mounted on the station frame, the controller being adapted to calibrate the GPS receiver, comprising:

retrieving from the GPS receiver a last reference position estimate;

receiving from the GPS receiver a new position estimate;

comparing said new position estimate to said last reference position estimate; and, determining a new reference position estimate if said new position estimate is not within a preset distance of said last reference position.

2. A method, as set forth in claim 1, wherein the step of determining a new reference position includes the steps of:

receiving a series of position estimates from the GPS receiver over a preset time period; and, calculating said new reference position as a function of said series of position estimates.

3. A method for automatically calibrating a Global Positioning System (GPS) satellite reference station, the reference station includes a station frame, a GPS receiver and a controller being mounted on the station frame, the controller being adapted to calibrate the GPS receiver, comprising:

placing the GPS receiver in an autonomous mode;

retrieving from the GPS receiver a last reference position;

receiving from the GPS receiver a new position estimate;

comparing said new position estimate to said last stored position estimate;

receiving a series of position estimates from the GPS receiver over a preset time period, calculating a new reference position as a function of said series of position estimates and calculating a new reference position if said new position estimate is not within a preset distance of said last reference position;

programming the GPS receiver with said reference station position; and placing the GPS receiver in a reference station mode.

4. A self-calibrating Global Positioning System (GPS) reference station, comprising:

a station frame;

a GPS receiver mounted to said station frame;

controlling means for initializing said GPS receiver, retrieving a last reference position from said GPS receiver, receiving a new position estimate from said GPS receiver, comparing said new position estimate to said last reference position; for determining a new reference position if said new position estimate is not within a preset distance of said last reference position; and for programming the GPS receiver with said new reference position.

5. A self-calibrating GPS reference station, as set forth in claim 4, wherein said GPS receiver is a Differential GPS receiver adapted to produce position correction signals, and wherein the self-calibrating GPS reference station includes:

a GPS antenna coupled to said GPS receiver;

a radio coupled to said controlling means;

and wherein said controlling means includes means for receiving the correction signals from said GPS receiver and transmitting the correction signals via said radio.

* * * * *